April 16, 1957
R. H. LISKA
2,788,672
MECHANISM FOR IMPARTING ROTARY MOTION
TO INDEX TABLES AND THE LIKE
Filed Jan. 7, 1954
5 Sheets-Sheet 2
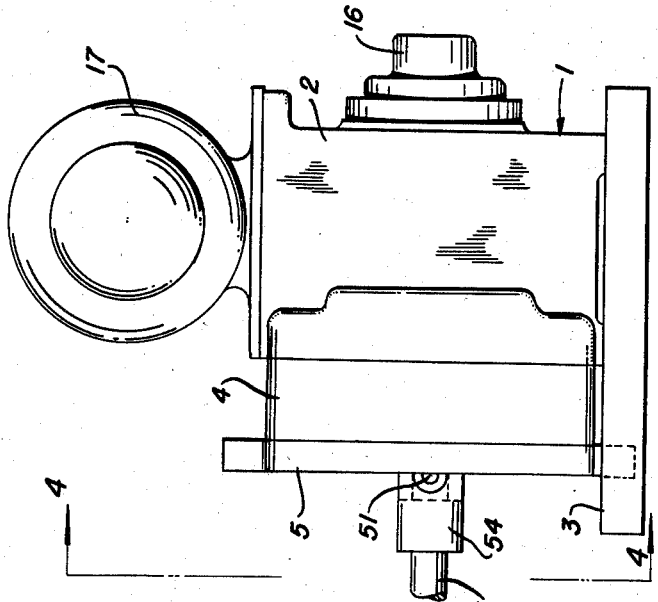
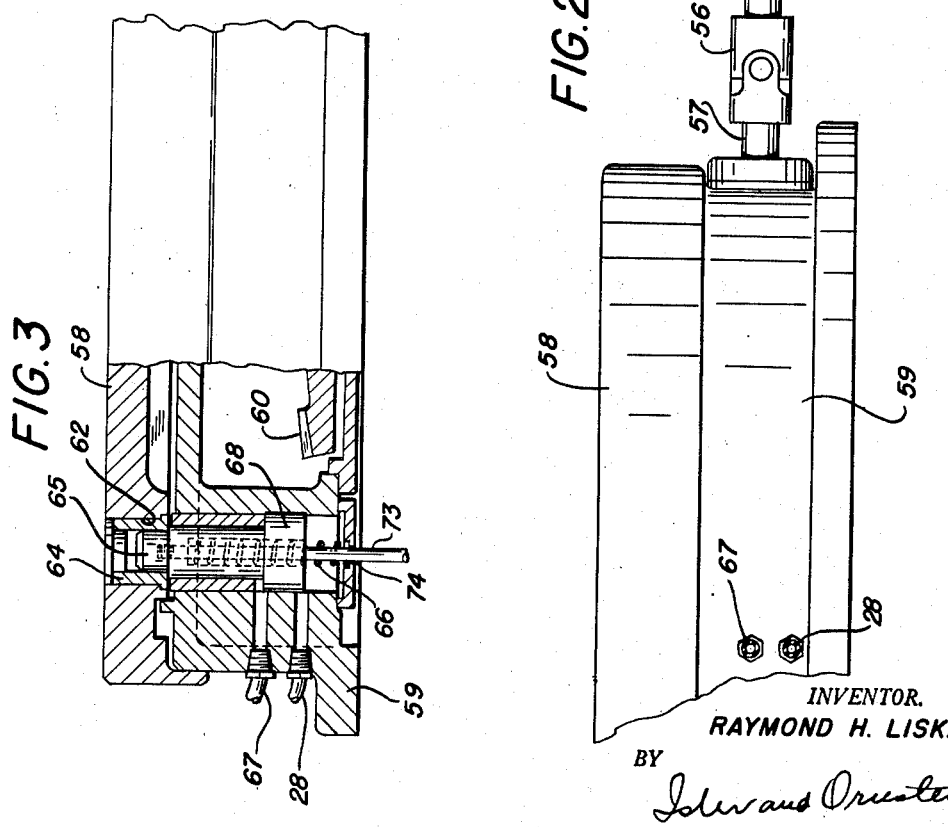
INVENTOR.
RAYMOND H. LISKA
BY
*Isler and Ornstein*
ATTORNEYS April 16, 1957

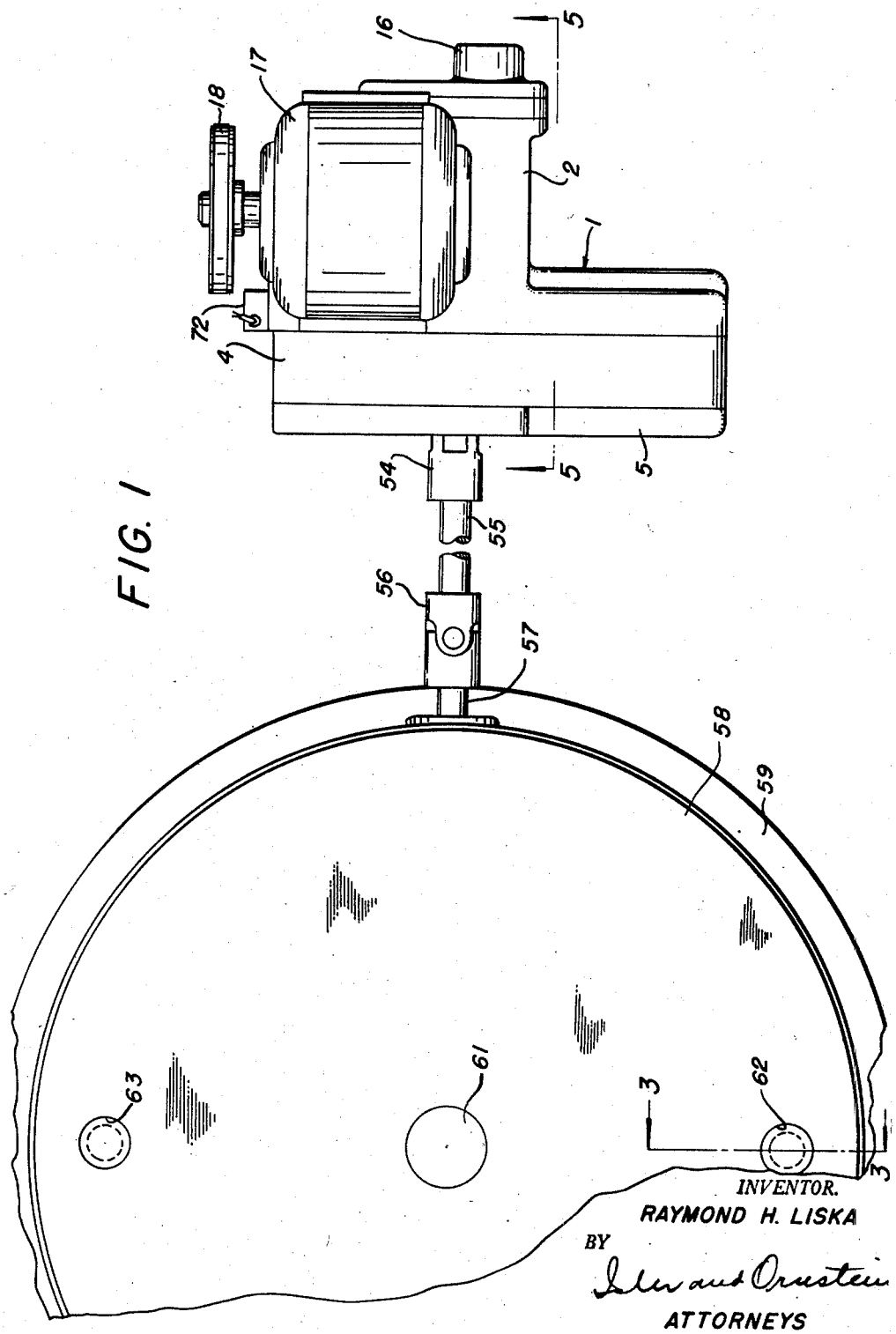

R. H. LISKA 2,788,672

MECHANISM FOR IMPARTING ROTARY MOTION
TO INDEX TABLES AND THE LIKE

Filed Jan. 7, 1954

INVENTOR.
RAYMOND H. LISKA
BY
*Telmand Ornstein*
ATTORNEYS

April 16, 1957

R. H. LISKA 2,788,672

MECHANISM FOR IMPARTING ROTARY MOTION
TO INDEX TABLES AND THE LIKE

Filed Jan. 7, 1954

INVENTOR.
RAYMOND H. LISKA
BY
*John and Ornstein*
ATTORNEYS

United States Patent Office 2,788,672
Patented Apr. 16, 1957

2,788,672

MECHANISM FOR IMPARTING ROTARY MOTION TO INDEX TABLES AND THE LIKE

Raymond H. Liska, Cleveland, Ohio, assignor to The Cleveland Universal Jig Company, Cleveland, Ohio, a corporation of Ohio Application January 7, 1954, Serial No. 402,743

6 Claims. (Cl. 74—393)

This invention relates generally to mechanism or means for imparting rotary movement to index tables and the like, but has reference more particularly to a mechanism which will impart a movement which is not uniform or constant throughout the cycle of rotation.

In my copending application, Serial No. 369,942, I have disclosed a mechanism which imparts an intermittent rotary motion to an index table or the like, without shock, and while keeping the table under positive control throughout the cycle. Such a mechanism imparts to the index table a rotary motion or movement which gradually varies from a zero velocity or speed at one station to a maximum speed or velocity at a point midway between that station and the next station, and back to zero speed or velocity at the next station.

The present application is directed to a modification of the mechanism described in my aforesaid copending application, in which modification, certain bevel gears, bearings, and other working parts have been eliminated, thereby substantially reducing the cost of manufacture of the mechanism, without substantially altering the nature of the movement obtained.

The present invention also has as one of its objects the provision of a mechanism of the character described which consists of a minimum number of parts that can be manufactured and assembled at relatively low cost, which does not require frequent repair or replacement of parts, but the parts of which are readily accessible for repair or replacement, if necessary.

Other objects and advantages of my invention will be apparent during the course of the following description.

In the accompanying drawings forming a part of this specification and in which like numerals are employed to designate like parts throughout the same, Fig. 1 is a top plan view of apparatus embodying the invention;

Fig. 2 is a front elevational view of the apparatus shown in Fig. 1;

Fig. 3 is a fragmentary cross-sectional view, taken on the line 3—3 of Fig. 1;

Figure 4:
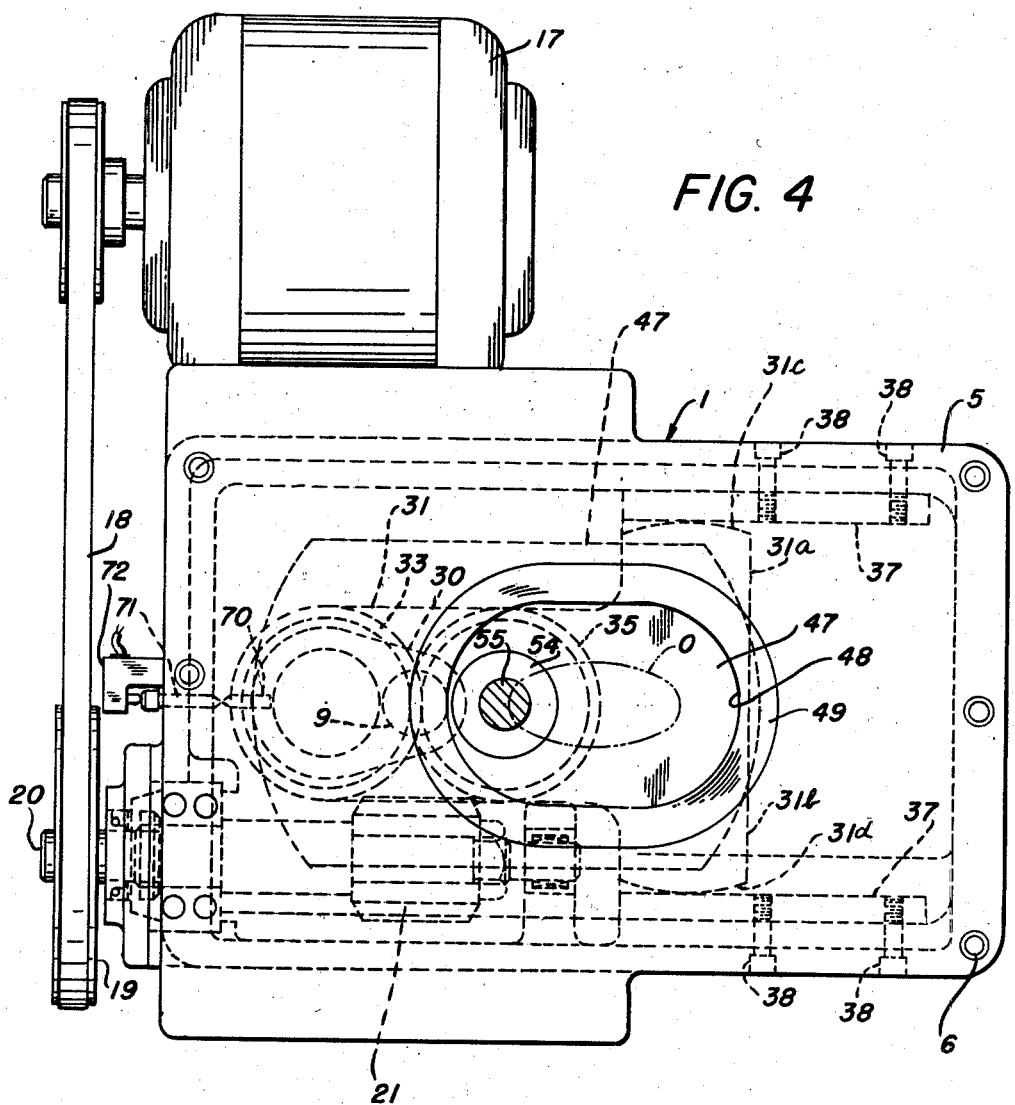
Fig. 4 is a cross-sectional view, taken on the line 4—4 of Fig. 2.
Figure 5:
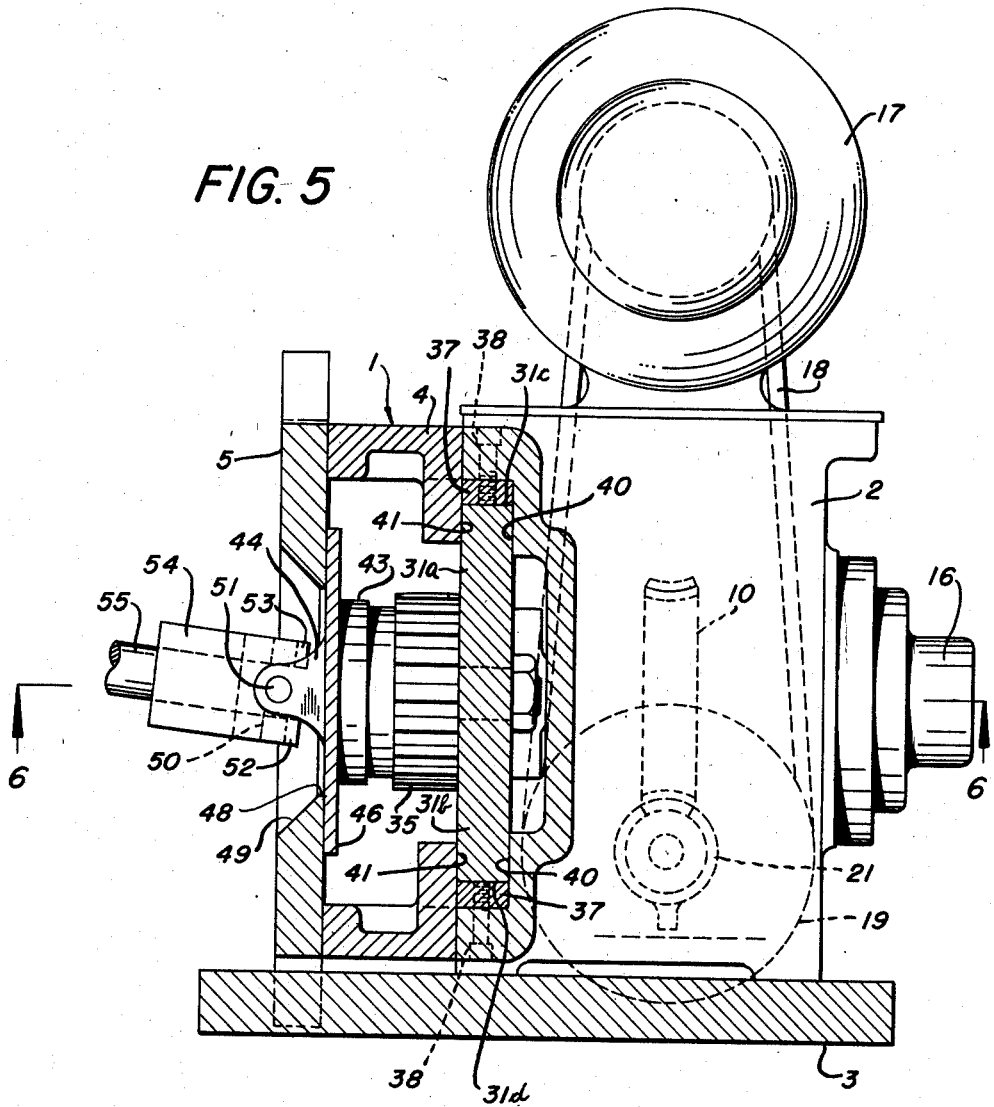
Fig. 5 is a cross-sectional view, taken on the line 5—5 of Fig. 1.

Referring more particularly to the drawings, reference numeral 1 designates generally a housing comprising a main portion 2 having a base 3, a spacer 4, and a cover plate 5, these parts being removably secured together as by means of screws 6.

Journalled for rotation in bearings 7 and 8 within the portion 2 of the housing is a shaft 9, which is adapted to be rotated by a worm wheel 10 which surrounds the shaft 9 and has secured to one end thereof (Fig. 6) a ring gear 11 having internal teeth 12. One end of the gear 11 bears against one end of a member 13 which contains the bearing 8, and which is secured to the portion 2 of the housing by means of screws 14. Secured to the member 13, as by screws 15, is a cap or cover member 16. The worm wheel 10 is continuously driven by an electric motor 17 through the intermediary of an endless belt 18, a pulley 19, a shaft 20 and a worm 21.

Splined or keyed to the shaft 9 is a clutch member 22, provided with gear teeth 23 which are adapted to be moved into driving engagement with the ring gear 11 at such times when it is desired to drive the shaft 9. Movement of the clutch member 22 for this purpose may be effected in a number of ways, but in this instance, I use a clutch fork 24, which is clamped to a rod 25, which is mounted for reciprocal movement in the housing 2 and is provided with a piston 26 at one end which moves in a cylindrical cavity 27 of the cap 16. When the clutch member 22 is to be engaged with the ring gear 12, compressed air is admitted into the cylinder 27 through a conduit 28, causing the rod 25 to move to the left, as viewed in Fig. 6. When the clutch member 22 is to be disengaged, compressed air is admitted into the cylinder 27 through a conduit 29, causing the rod 25 to move to the right, as viewed in Fig. 6.

The shaft 9 is provided at its inner end with a crank arm 30, to which one end of a link or arm 31 is pivotally connected. This link or arm 31 has journalled in an opening 32 thereof a drive gear 33, which is rigidly secured to the crank arm 30 by means of screws 34. The axis of the shaft 9 intersects the pitch circle of the gear 33 and this relationship remains constant throughout the operation of the device which will be presently described.

The drive gear 33 drives a second gear 35 which is identical in size with the gear 33 and lies in the same plane as the latter, being also free to rotate relatively to the link 31. For the purpose of permitting such rotation, a pin 36, which extends axially through the gear 35 is rigidly secured to the link 31, as by means of a nut 37, and roller or pin bearings 38 and 39 are interposed between the gear 35 and the pin 36.

The link 31 is T-shaped, the arms 31a and 31b of the link terminating in arcuate end surfaces, 31c and 31d respectively. The surfaces 31c and 31d bear against wear plates 37, which are secured to the wall of the housing 2 by means of screws 38. The arcuate surfaces 31c and 31d permit the link 31 to have a rocking or oscillatory movement in its own plane incidental to the operation of the mechanism, as will be presently described. The link is guided in such oscillatory movement between surfaces 40 of the housing portion 2 and surfaces 41 of the spacer 4.

Secured to the gear 35, as by means of screws 42 is a coupling element 43 which is in axial alignment with the gear and is provided with a pair of spaced ears 44 and 45 which extend through an opening 46 in a slide plate 47 which is interposed between the coupling element 43 and the cover 5 of the housing. The ears 44 and 45 also extend through an oval-shaped opening 48 in the cover 5, which opening has a beveled edge 49.

Journalled for rotation in the ears 44 and 45 is a shaft 50 having trunnions 51 extending at right angles thereto, to which the ears 52 and 53 of a second coupling member 54 are pivoted. The parts 44, 45, 50, 51, 52, 53 and 54 form a universal joint or coupling.

A shaft 55 extends from the coupling member 54, and drives an index table through a universal coupling or joint 56 and shaft 57.

The index table, designated 58, is mounted for rotation on a base 59. Rotation is effected by the shaft 57 through the intermediary of a bevel pinion (not shown), a bevel gear 60 (Fig. 3), and a shaft 61 secured to the center of the table 58.

The table 58 is provided at circumferentially-spaced points with recesses 62 and 63, in which are mounted bushings 64, which are adapted to receive the index pin 65, for the purpose of locking the table to the base 59. The recesses 62 and 63 define stations of a two-station table, and in this case, are 180 degrees apart. It will be readily understood, however, that the table may be provided with any desired number of such recesses, defining additional stations.

The index pin may be actuated in any desired or conventional manner. In this case, the index pin is automatically moved into locking position by means of a compression coil spring 66, and is retracted by means of compressed air which enters the base 59 through a conduit 67, to exert pressure on the piston-like head 68 of the pin 65.

The driving mechanism which has been described is designed to rotate the index table between stations, but in view of the large mass which is to be thus moved, it is desirable to impart to the table a rotary motion which gradually varies from a zero velocity or speed at one station to a maximum speed or velocity at a point midway between that station and the next station, and back to zero speed or velocity at the next station. It is desirable, in other words, to produce an intermittent rotary motion which will start and stop the index table without shock and yet keep the table under positive control throughout the cycle.

Such a motion has been obtained by means of the drive mechanism shown and described in my copending application, Serial No. 369,942.

In the present case, the motion is obtained through a modification of the mechanism described in that application, with the elimination of certain parts of that mechanism which is designed to reduce costs to some extent, and utilize a more direct drive of the index table.

The gear ratios in the present device are such that one complete revolution of the shaft 9 will produce a half revolution of the index table 58, which is equivalent to rotation of the table between its two stations.

The shaft 9 drives the shaft 55 through the intermediary of the crank arm 30, gear 33, gear 35, coupling element 43 and coupling element 54.

At the beginning of this rotation, the velocity of the gear 33 is zero, and from this point until the crank arm 30 has rotated through a half revolution, the velocity increases gradually, but relatively slowly, reaching a maximum when the crank arm is at a position 180 degrees from that shown. From this point, and until the crank arm 30 has returned to its original or initial position, the velocity changes in the same manner, but is a decelerated velocity, becoming a zero velocity when the crank arm is in its initial position again.

The movement may be understood by reference to the explanation given in the aforesaid copending application. In the present case, however, a number of gears and other parts have been omitted, which considerably reduces the cost of manufacture of the driving mechanism.

During the movement of the gears 33 and 35, the end of the shaft 55 which is disposed in the coupling element 54 moves in an oval or elliptical orbit, which is shown at 0 in Fig. 4, this orbital movement being permitted by the universal coupling of the shaft 55 to the coupling member 43. The shaft 55 is made sufficiently long that the end of the shaft which is connected to the universal coupling 56 has virtually no orbital movement, the universal coupling or joint 56 permitting the shaft 57 to rotate about its own axis only.

The link 31, during the rotation of the shaft 9, moves in a path which causes the arms 31a and 31b thereof to rock slightly with respect to the wear strips 37, and this rocking is permitted by the engagement of the arcuate ends 31c and 31d with the wear strips.

During the aforesaid movements the cover plate 47 slides over the opening 48, but at no time uncovers this opening. In this manner, the plate 47 provides protection against the entry of dirt and foreign matter into the housing and mechanism.

In Figs. 2, 3, 4 and 6, means are shown, somewhat diagrammatically, for automatically retracting the index pin 65 at the beginning of the cycle of rotation of the shaft 9 and for automatically returning the index pin to locking position at the conclusion of this cycle. Such means comprises a pin 70 which projects from the end of the link 31, a pin 71 slidably mounted in the housing 1, and a switch 72.

Figure 6:
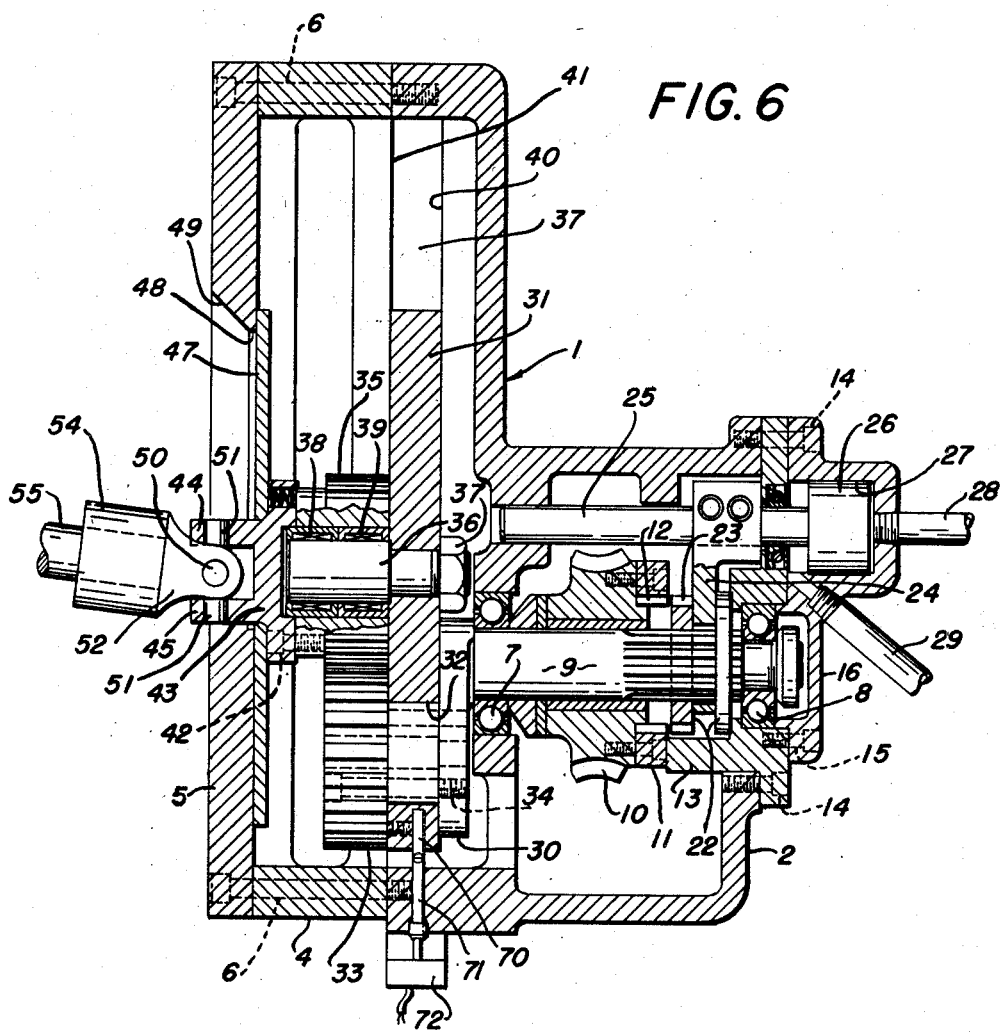
Fig. 6 is a cross-sectional view, taken on the line 6—6 of Fig. 5.

Referring to Figs. 3 and 6, it will be noted that the air cylinder 27 is provided with two conduits 28 and 29, conduit 28 in Fig. 6 being a continuation of this conduit shown in Fig. 3. An air vent is shown at 73 (Fig. 3), and a pull rod at 74. Conduit 67 (Fig. 3) and conduit 29 (Fig. 6) are connected to a four-way electrically-operated air valve (not shown), normally deenergized, so as to admit compressed air through conduit 29 (Fig. 6) into the chamber at the left of the piston 26, thereby keeping clutch member 22 disengaged and letting air escape through conduit 67 (Fig. 3) and through said air valve. This permits spring 66 (Fig. 3) to keep the index pin in the locking position shown.

In order to start an indexing cycle, an electric manually-operated push button (not shown) will energize the aforesaid electric four-way valve, thereby reversing the compressed air flow. Air will now flow through conduit 67 (Fig. 3) into the upper chamber of the index pin cylinder, thereby disengaging index pin 65. When the index pin is safely disengaged, the upper surface of piston 68 will uncover the air port to which conduit 28 is attached and carry compressed air through conduit 28 into the chamber at the right of the piston 26 (Fig. 6), forcing piston 26 to the left, thereby engaging clutch teeth 12 and 23. Since the worm wheel 10 is in constant motion, the index cycle is started and continues until pin 70 again cams past pin 71 which, through switch 72, deenergizes the four-way valve, reversing the compressed air flow, disengaging the clutch teeth, and engaging the index pin. This completes the index cycle, during which gear 35 will have revolved one revolution, from zero to zero motion.

The aforesaid method of operation provides an interlock feature which at no time permits simultaneous engagement of the index pin and drive clutch which might cause breakage of parts.

The pull rod 74 is provided for the purpose of manually disengaging the index pin during job set-up or checking.

It is to be understood that the form of my invention, herewith shown and described, is to be taken as a preferred example of the same, and that various changes in the shape, size, and arrangement of parts may be resorted to, without departing from the spirit of my invention, or the scope of the subjoined claims.

Having thus described my invention, I claim:

1. In a mechanism for rotating an index table in a predetermined pattern of speed, a drive shaft having a crank arm, a gear rigidly secured to said crank arm and having its axis spaced from and parallel with the axis of said shaft, a link having one end thereof pivotally secured to said crank arm coaxially with the axis of said gear, rectilinear guide means engaging the other end of said link to define a linear path of movement therefor, and a second gear rotatably mounted on said link intermediate the ends thereof in mesh with said first-named gear, whereby said second gear is movable by said link in an elliptical path in response to rotation of said crank arm.

2. Mechanism, as recited in claim 1, in which the axis of the drive shaft intersects the pitch circle of the first-named gear.

3. Mechanism, as recited in claim 2, including elements secured to said second gear constituting a universal joint, and a second shaft driven by said universal joint.

4. In mechanism of the character described, a housing, having an elliptical-shaped opening, a cover plate covering said opening at all times, and means for constraining said cover plate to move in an elliptical path, said means comprising a shaft, a crank arm on said shaft, a gear fixed to said crank arm, for rotation therewith, a link, having one end thereof pivotally secured to said crank arm coaxially with said gear, means defining a rectilinear path of movement for the other end of said link, and means connecting said cover plate to said link intermediate the ends thereof.

5. Mechanism, as defined in claim 4, including a second gear rotatably secured to said link intermediate the ends thereof, and in mesh with said first gear, whereby said second gear is movable by said link in an elliptical path.

6. Mechanism as defined in claim 5, wherein said last-named means comprises a driven shaft traversing said cover plate and secured to said second gear for movement therewith.

References Cited in the file of this patent

UNITED STATES PATENTS

| | | |
|---|---|---|
| 1,916,871 | Swift | July 4, 1933 |
| 1,920,877 | Bert 'Odatto | Aug. 1, 1933 |

FOREIGN PATENTS

| | | |
|---|---|---|
| 703,540 | France | May 1, 1931 |